UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

LEUCO DERIVATIVE OF THE GALLOCYANIN SERIES.

No. 884,745.

Specification of Letters Patent.

Patented April 14, 1908.

Application filed January 6, 1903. Serial No. 409,534.

*To all whom it may concern:*

Be it known that I, WILHELM LOMMEL, doctor of philosophy, chemist, citizen of the German Empire, residing at Elberfeld, Germany, Kingdom of Prussia, have invented new and useful Improvements in New Leuco Derivatives of the Gallocyanin Series, of which the following is a specification.

This invention relates to the manufacture and production of new leuco compounds of the gallocyanin series which can be obtained by heating above 100° C. in suspension or in solution dyes of the gallocyanin type, either as bases or as salts. The hydrochlorids of new leuco compounds are dark powders soluble in water. On adding sodium carbonate to their aqueous solutions the free bases separate out which oxidize very rapidly on exposure to air. They produce in dyeing or printing considerably bluer or greener shades than the known leuco compounds of the dyes from which they are prepared.

The following examples will further illustrate my invention, the parts being by weight:

Example I. 1 part of celestine blue (dyestuff obtained from nitroso-diethylanilin and gallaminic acid) is heated to 150° centigrade with 2 parts of glycerin. The mixture has to be continuously stirred. The reaction is complete, when a test portion is soluble in water with a yellowish-brown color which requires about 2 hours. The melt is then dissolved in water. The solution thus obtained can be used without further purification for dyeing or printing, or the new leuco compound can be precipitated from the solution by the addition of common salt. The hydrochlorid of the new leuco compound forms after being dried and pulverized a dark powder which is soluble in water and is soluble in concentrated sulfuric acid with a yellowish-brown color which color turns blue by the addition of oxidizing agents. It produces when printed with chromium compounds on cotton indigo-blue shades.

Example II. In an autoclave provided with a stirrer a mixture of 20 parts of gallamin blue (dyestuff obtained from nitroso-dimethylanilin and gallaminic acid) and 50 parts of water is heated for 7 hours to 125° centigrade. The brown product thus obtained can be used without further purification for dyeing or printing. It produces when printed with chromium compounds on cotton indigo-blue shades.

Example III. 20 parts of celestine blue are mixed with 50 parts of alcohol and the resulting mixture which has to be continuously stirred is heated in an autoclave to 140° centigrade for 3 hours. The alcohol is distilled off *in vacuo*. The solution of the residue in water can be used without further purification for dyeing or printing.

The process is carried out in an analogous manner on treating as above described other dyes of the gallocyanin series or on treating the free bases of the dyestuffs. The leuco products can also be oxidized and then used for dyeing or printing.

Having now described my invention and in what manner the same is to be performed, what I claim as new and desire to secure by Letters Patent is:—

1. The herein-described new leuco-compounds of the gallocyanin series obtainable by heating with diluents above 100° centigrade dyes of the gallocyanin series, which new leuco-compounds are in the shape of the hydrochlorids dark powders soluble in water, the free bases being separated by adding sodium carbonate to the aqueous solutions; and producing in dyeing or printing considerably bluer or greener shades than the known leuco compounds of the dyes from which they are prepared, substantially as described.

2. The herein-described new leuco-compound of the gallocyanin series obtainable by heating celestine blue with glycerin above 100° C. which new leuco-compound is in the shape of its hydrochlorid a dark powder which is soluble in water and is soluble in concentrated sulfuric acid with a yellowish-brown color turning blue by the addition of an oxidizing agent; and producing when printed with chromium compounds on cotton indigo-blue shades, substantially as described.

In testimony whereof I have hereunto set my hand in the presence of two subscribing witnesses.

WILHELM LOMMEL. [L. S.]

Witnesses:
OTTO KÖNIG,
WM. WASHINGTON BRUNSWICK.